(12) United States Patent
Luo et al.

(10) Patent No.: US 9,997,994 B1
(45) Date of Patent: Jun. 12, 2018

(54) TOTEM-POLE POWER FACTOR CORRECTOR AND CURRENT-SAMPLING UNIT THEREOF

(71) Applicant: ACBEL POLYTECH INC., New Taipei (TW)

(72) Inventors: Cheng-Hsiao Luo, New Taipei (TW); Chia-An Yeh, New Taipei (TW); Wei-Liang Lin, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 0 days. days.

(21) Appl. No.: 15/594,194

(22) Filed: May 12, 2017

(51) Int. Cl.
| | |
|---|---|
| *G05F 1/33* | (2006.01) |
| *G05F 5/00* | (2006.01) |
| *H02M 1/42* | (2007.01) |
| *H02M 7/06* | (2006.01) |
| *H02M 3/335* | (2006.01) |
| *H02M 1/08* | (2006.01) |
| *H02M 1/00* | (2006.01) |

(52) U.S. Cl.
CPC .............. *H02M 1/42* (2013.01); *H02M 1/08* (2013.01); *H02M 3/33546* (2013.01); *H02M 7/06* (2013.01); *H02M 2001/0009* (2013.01)

(58) Field of Classification Search
CPC ............. H02M 1/4208; H02M 1/4233; H02M 1/4241; H02M 1/4258; H02M 1/42; H02M 7/12; H02M 2001/0009; H02M 7/06; H02M 1/08; H02M 3/33546; Y02B 70/126

USPC ...... 323/207; 363/76, 77, 81, 82, 84, 86, 88, 363/89, 90, 125, 126, 127; 307/127
See application file for complete search history.

(56) References Cited

U.S. PATENT DOCUMENTS

| | | | | |
|---|---|---|---|---|
| 9,667,136 | B1 * | 5/2017 | Lin ..................... | H02M 1/4208 |
| 9,762,123 | B1 * | 9/2017 | Lin ..................... | H02M 3/156 |
| 2011/0012579 | A1 * | 1/2011 | Huang ............... | H02M 1/4208 323/304 |
| 2012/0044729 | A1 * | 2/2012 | Coleman ............ | H02M 1/4258 363/126 |
| 2017/0214314 | A1 * | 7/2017 | Jitaru ................. | H02M 1/4208 |

* cited by examiner

*Primary Examiner* — Alex Torres-Rivera
(74) *Attorney, Agent, or Firm* — Withrow & Terranova, P.L.L.C.

(57) ABSTRACT

A totem-pole PFC and a current-sampling unit of the totem-pole PFC are provided. The totem-pole PFC is electrically connected to an AC power source and a DC-to-DC converter, and is electrically connected to a load through the DC-to-DC converter. The current-sampling unit has a first sampling switch and a second sampling switch. The first sampling switch and the second sampling switch are controlled to be turned on and turned off so that a magnetizing current flows through the magnetizing inductor when a magnetizing inductor is magnetized and a demagnetizing current does not flow through the sampling resistor when the magnetizing inductor is demagnetized, thereby increasing the demagnetization efficiency and overcoming superimposed operations to improve current detection and increase conversion efficiency of the power conversion.

20 Claims, 20 Drawing Sheets

TOTEM-POLE POWER FACTOR CORRECTOR AND CURRENT-SAMPLING UNIT THEREOF

BACKGROUND OF THE INVENTION

1. Technical Field

The present disclosure relates generally to a power factor corrector (PFC), and more particularly to a totem-pole PFC and a current-sampling unit of the totem-pole PFC.

2. Description of Related Art

An alternating-current (AC) utility power is usually provided to supply various loads. However, some loads are only supplied by a direct current (DC) power. Hence, a power conversion circuit is used to convert the AC utility power into the DC power for supplying the loads that require the DC power.

Referring to FIG. 14, a power conversion circuit includes a totem-pole power factor corrector (PFC) 30 and a DC-to-DC converter 40. The power conversion circuit is used to increase conversion efficiency of power conversion and provide stable direct-current (DC) power to supply a load $R_L$.

The totem-pole PFC 30 is electrically connected to an alternating-current (AC) power source $V_{AC}$ to correct the power factor of the AC power source $V_{AC}$, and the corrected AC power source $V_{AC}$ is outputted to the DC-to-DC converter 40. The DC-to-DC converter 40 converts the corrected AC power source $V_{AC}$ into a DC power source required for the load $R_L$.

The totem-pole PFC 30 includes a first bridge arm unit 31, a second bridge arm unit 32, a power factor correction (PFC) inductor L, and a capacitor C. The first bridge arm unit 31, the second bridge arm unit 32, and the capacitor C are connected in parallel. The first bridge arm unit 31 has a first switch Q1 and a second switch Q2 electrically connected to the first switch Q1. The second bridge arm unit 32 has a third switch Q3 and a fourth switch Q4 electrically connected to the third switch Q3. The first switch Q1 of the first bridge arm unit 31 is electrically connected to the second switch Q2 of the first bridge arm unit 31 at a first node n1. The third switch Q3 of the second bridge arm unit 32 is electrically connected to the fourth switch Q4 of the second bridge arm unit 32 at a second node n2. The AC power source $V_{AC}$ and the PFC inductor L connected to the AC power source $V_{AC}$ are electrically connected between the first node n1 and the second node n2. The capacitor C is electrically connected between a positive output end $V_{CC}$ and a grounding end GND, and the DC-to-DC converter 40 is electrically connected between the positive output end $V_{CC}$ and the grounding end GND. A first current-sampling unit CT1 is electrically connected to the third switch Q3 of the second bridge arm unit 32 for detecting a current flowing through the third switch Q3. A second current-sampling unit CT2 is electrically connected to the fourth switch Q4 of the second bridge arm unit 32 for detecting a current flowing through the fourth switch Q4.

Also referring to FIG. 15 and FIG. 16, when the AC power source $V_{AC}$ is in a positive half cycle, the electrical power provided by the AC power source $V_{AC}$ is transmitted to the second bridge arm unit 32 via the second node n2 through the PFC inductor L. As shown in FIG. 15, the PFC inductor L is initially magnetized by the electrical power provided by the AC power source $V_{AC}$. At this time, the fourth switch Q4 and the second switch Q2 are turned on so that a current loop is formed by the AC power source $V_{AC}$, the PFC inductor L, the fourth switch Q4, and the second switch Q2 to provide a magnetizing current to magnetize the PFC inductor L. Afterward, as shown in FIG. 16, the PFC inductor L is demagnetized after the PFC inductor L is fully magnetized. At this time, the fourth switch Q4 is turned off and the third switch Q3 is turned on (the second switch Q2 is still turned on) so that a current loop is formed by the AC power source $V_{AC}$, the PFC inductor L, the third switch Q3, the DC-to-DC converter 40, the load $R_L$, and the second switch Q2 to provide a demagnetizing current to demagnetize the PFC inductor L. Accordingly, it is to improve the power factor of the power conversion circuit and increase conversion efficiency of the power conversion circuit when the AC power source $V_{AC}$ is in the positive half cycle.

Also referring to FIG. 17 and FIG. 18, when the AC power source $V_{AC}$ is in a negative half cycle, the electrical power provided by the AC power source $V_{AC}$ is transmitted to the first bridge arm unit 31 via the first node n1. As shown in FIG. 17, the first switch Q1 and the third switch Q3 are initially turned on so that a current loop is formed by the AC power source $V_{AC}$, the first switch Q1, the third switch Q3, and the PFC inductor L to provide a magnetizing current to magnetize the PFC inductor L. Afterward, as shown in FIG. 18, the PFC inductor L is demagnetized after the PFC inductor L is fully magnetized. At this time, the third switch Q3 is turned off and the fourth switch Q4 is turned on (the first switch Q1 is still turned on) so that a current loop is formed by the AC power source $V_{AC}$, the first switch Q1, the DC-to-DC converter 40, the load $R_L$, the fourth switch Q4, and the PFC inductor L to provide a demagnetizing current to demagnetize the PFC inductor L. Accordingly, it is to improve the power factor of the power conversion circuit and increase conversion efficiency of the power conversion circuit when the AC power source $V_{AC}$ is in the negative half cycle.

As shown in FIG. 14 and FIG. 19, the thick solid line represents a curve of a current provided by the AC power source $V_{AC}$, and the current curve is a sine-wave curve. The current flowing through the third switch Q3 is detected by the first current-sampling unit CT1, and the dash line represents the curve of the current flowing through the third switch Q3. The current flowing through the fourth switch Q4 is detected by the second current-sampling unit CT2, and the thin solid line represents the curve of the current flowing through the fourth switch Q4. As shown by the solid line in FIG. 19, the second current-sampling unit CT2 detects the magnetizing current of the PFC inductor L when the AC power source $V_{AC}$ is in the positive half cycle and detects the demagnetizing current of the PFC inductor L when the AC power source $V_{AC}$ is in the negative half cycle. As shown by the thin solid line in FIG. 19, the first current-sampling unit CT1 detects the demagnetizing current of the PFC inductor L when the AC power source $V_{AC}$ is in the positive half cycle and detects the magnetizing current of the PFC inductor L when the AC power source $V_{AC}$ is in the negative half cycle.

Referring to FIG. 20, the first current-sampling unit CT1 and the second current-sampling unit CT2 are each respectively a current transformer. The current transformer includes a current-transducing unit 33, a magnetizing inductor $L_m$, a demagnetizing resistor $R_C$, a bridge rectifying unit 34, and a sampling resistor Rs. The current-transducing unit 33 has a primary-side winding $W_1$ and a secondary-side winding $W_2$, and the primary-side winding $W_1$ is connected in series to an object under test. For example, the primary-side winding $W_1$ of the first current-sampling unit CT1 is connected in series to the third switch Q3 since the first current-sampling unit CT1 is used to detect the current flowing through the third switch Q3. Similarly, the primary-side winding $W_1$ of the second current-sampling unit CT2 is connected in series to the fourth switch Q4 since the second current-sampling unit CT2 is used to detect the current flowing through the fourth switch Q4.

The secondary-side winding $W_2$ of the current-transducing unit 33 is connected in parallel to the magnetizing inductor $L_m$ and the demagnetizing resistor $R_C$, and is further connected to the sampling resistor Rs through the bridge rectifying unit 34.

The secondary-side winding $W_2$ of the current-transducing unit 33 outputs a current by inducing the current flowing through the primary-side winding $W_1$, i.e., the current flowing through the object under test. The current outputted from the secondary-side winding $W_2$ is rectified by the bridge rectifying unit 34 and flows through the sampling resistor Rs. The current flowing through the sampling resistor Rs can be obtained according to a voltage across the sampling resistor Rs and a resistance of the sampling resistor Rs. Accordingly, the current flowing through the primary-side winding $W_1$, i.e., the current flowing through the object under test, can be detected.

Referring to FIG. 21 and FIG. 22, the second current-sampling unit CT2 is exemplified for demonstration as follows. Also referring to FIG. 15 and FIG. 16, when the AC power source $V_{AC}$ is in the positive half cycle, the PFC inductor L is alternately magnetized and demagnetized. As shown in FIG. 15, when the PFC inductor L is magnetized, the magnetizing current flows through the second current-sampling unit CT2, and then flows through the fourth switch Q4 and flows back to the AC power source $V_{AC}$. As shown in FIG. 21, the secondary-side winding $W_2$ of the second current-sampling unit CT2 generates an induction current. The magnetizing inductor $L_m$ is magnetized by the induction current to generate a current $i_{LM}$, and then the current $i_{LM}$ flows through the magnetizing inductor $L_m$ and the induction current flows through the sampling resistor Rs so that the current flowing through the fourth switch Q4 can be acquired according to the voltage across the sampling resistor Rs and the resistance of the sampling resistor Rs.

Similarly, referring to FIG. 23 and FIG. 24, the second current-sampling unit CT2 is exemplified for demonstration as follows. Also referring to FIG. 17 and FIG. 18, when the AC power source $V_{AC}$ is in the negative half cycle, the PFC inductor L is alternately magnetized and demagnetized. As shown in FIG. 18, when the PFC inductor L is demagnetized, the demagnetizing current flows through the fourth switch Q4, and then flows through the second current-sampling unit CT2 and flows back to the AC power source $V_{AC}$. As shown in FIG. 23, the secondary-side winding $W_2$ of the second current-sampling unit CT2 generates an induction current. The magnetizing inductor $L_m$ is magnetized by the induction current to generate the current $i_{LM}$, and then the current $i_{LM}$ flows through the magnetizing inductor $L_m$ and the induction current flows through the sampling resistor Rs so that the current flowing through the fourth switch Q4 can be acquired according to the voltage across the sampling resistor Rs and the resistance of the sampling resistor Rs.

As shown in FIG. 17, when the PFC inductor L is magnetized, no current flows through the fourth switch Q4 since the fourth switch Q4 is turned off. As shown in FIG. 24, no induction current is generated from the secondary-side winding $W_2$ of the second current-sampling unit CT2 so that the magnetizing inductor $L_m$ is demagnetized to generate the current $i_{LM}$, and the demagnetizing current flows through the bridge rectifying unit 34 and the sampling resistor Rs. At this time, the demagnetizing resistor $R_C$ provides another loop for demagnetizing the magnetizing inductor $L_m$. In this embodiment, the large part of the magnetizing current flows through the sampling resistor Rs rather than the demagnetizing resistor $R_C$ since the resistance of the sampling resistor Rs is much less than the resistance of the demagnetizing resistor $R_C$. However, the magnetizing inductor $L_m$ is not fully magnetized since the resistance of the sampling resistor Rs is too small. When the PFC inductor L is demagnetized again, i.e., the fourth switch Q4 is turned on again and the induction current is generated again from the secondary-side winding $W_2$ of the second current-sampling unit CT2, the magnetizing inductor $L_m$ is demagnetized again under the non-fully magnetized condition so that the induction current generated from the secondary-side winding $W_2$ is superimposed on the non-fully magnetized current $i_{LM}$. Once the PFC inductor L is alternately magnetized and demagnetized, a current error between the current flowing through the sampling resistor Rs and the current generated again from the secondary-side winding $W_2$ is produced so that the current flowing through the fourth switch Q4 is incorrectly acquired.

Each of the switches of the totem-pole PFC is controlled according to the value of the current flowing through the corresponding switch. As shown by the dash line in FIG. 19, the dash line represents the curve of the current flowing through the fourth switch Q4, which is sampled by the second current-sampling unit CT2. When the AC power source $V_{AC}$ is in the positive half cycle and the fourth switch Q4 is turned on, the PFC inductor L is magnetized so that the secondary-side winding $W_2$ of the second current-sampling unit CT2 generates the induction current and the induction current is sampled by the sampling resistor Rs. When the current sampled by the second current-sampling unit CT2 is equal to the current generated by the AC power source $V_{AC}$, it means that the PFC inductor L is fully magnetized. Afterward, the fourth switch Q4 is turned off and the third switch Q3 is turned on so that the PFC inductor L is demagnetized. At this time, no induction current is generated at the secondary-side winding $W_2$ of the second current-sampling unit CT2 since the fourth switch Q4 is turned off so that a current sampled by the sampling resistor Rs is zero.

When the AC power source $V_{AC}$ is in the negative half cycle and the fourth switch Q4 is turned on, the PFC inductor L is demagnetized so that the secondary-side winding $W_2$ of the second current-sampling unit CT2 generates the induction current and the induction current is sampled by the sampling resistor Rs. When the current sampled by the second current-sampling unit CT2 is zero, it means that the PFC inductor L is fully demagnetized. Afterward, the fourth switch Q4 is turned off and the third switch Q3 is turned on so that the PFC inductor L is magnetized. At this time, no induction current is generated at the secondary-side winding $W_2$ of the second current-sampling unit CT2 since the fourth switch Q4 is turned off so that the current sampled by the sampling resistor Rs is zero.

As shown by the dash line in FIG. 19, the thin solid line represents the curve of the current flowing through the third switch Q3, which is sampled by the first current-sampling unit CT1. When the AC power source $V_{AC}$ is in the positive half cycle and the third switch Q3 is turned on, the PFC inductor L is demagnetized so that the secondary-side winding $W_2$ of the first current-sampling unit CT1 generates the induction current and the induction current is sampled by the sampling resistor Rs. When the current sampled by the first current-sampling unit CT1 is zero, it means that the PFC inductor L is fully demagnetized. Afterward, the third switch Q3 is turned off and the fourth switch Q4 is turned on so that the PFC inductor L is magnetized. At this time, no induction current is generated at the secondary-side winding $W_2$ of the first current-sampling unit CT1 since the third switch Q3 is turned off so that a current sampled by the sampling resistor Rs is zero. When the AC power source $V_{AC}$ is in the negative half cycle and the third switch Q3 is turned on, the PFC inductor L is magnetized so that the secondary-side winding $W_2$ of the first current-sampling unit CT1 generates the induction current and the induction current is sampled by the sampling resistor Rs. When the current sampled by the first current-sampling unit CT1 is equal to the current generated by the AC power source $V_{AC}$, it means that the PFC inductor L is fully magnetized. Afterward, the third switch Q3 is turned off and the fourth switch Q4 is turned on so that the PFC inductor L is demagnetized. At this time, no induction current is generated at the secondary-side winding $W_2$ of the first current-sampling unit CT1 since the third switch Q3 is turned off so that the current sampled by the sampling resistor Rs is zero.

Since each of the switches of the totem-pole PFC is controlled according to the value of the current flowing through the corresponding switch, which is detected by the corresponding current-sampling unit, the totem-pole PFC would fail to effectively provide the function of power factor correction and decrease conversion efficiency of the power conversion circuit once the values of the currents detected by the current-sampling units are inaccurate.

SUMMARY

In order to overcome the above-mentioned disadvantages of the incorrect current detection and lower conversion efficiency due to the non-fully demagnetized condition resulting from the too-small resistance of the sampling resistor, a totem-pole power factor corrector and a current-sampling unit thereof are disclosed to overcome superimposed operations to improve current detection and increase conversion efficiency of the power conversion.

The totem-pole power factor corrector is electrically connected to an alternating-current (AC) power source and a load through a DC-to-DC converter. The current-sampling unit detects a current flowing through a switch unit of the totem-pole power factor corrector. The current-sampling unit of the totem-pole power factor corrector includes a primary-side winding, a full-bridge rectifying unit, a secondary-side winding, a magnetizing inductor, a demagnetizing component, and a sampling resistor. The primary-side winding is connected in series to the switch unit. The full-bridge rectifying unit has a first input end, a second input end, a first output end, a second output end, a first sampling switch, and a second sampling switch, and further has a first current sampling path and a second current sampling path, wherein the first sampling switch is on the first current sampling path and the second sampling switch is on the second current sampling path. The secondary-side winding is coupled to the primary-side winding. The demagnetizing component is connected in parallel to the secondary-side winding and the magnetizing inductor between the first input end and the second input end of the full-bridge rectifying unit. The sampling resistor is electrically connected between the first output end and the second output end of the full-bridge rectifying unit.

When the AC power source is in a positive half cycle, the first sampling switch is turned on, the second sampling switch is turned off, the magnetizing inductor is magnetized, and through the first current sampling path of the full-bridge rectifying unit, the secondary-side winding and the sampling resistor form a first loop, and when the AC power source is in the positive half cycle, the first sampling switch is turned on, the second sampling switch is turned off, the magnetizing inductor is demagnetized, and the magnetizing inductor and the sampling resistor are disconnected from each other.

When the AC power source is in a negative half cycle, the second sampling switch is turned on, the first sampling switch is turned off, the magnetizing inductor is magnetized, and through the second current sampling path of the full-bridge rectifying unit, the secondary-side winding and the sampling resistor form a second loop, and when the AC power source is in the negative half cycle, the second sampling switch is turned on, the first sampling switch is turned off, the magnetizing inductor is demagnetized, and the magnetizing inductor and the sampling resistor are disconnected from each other.

The totem-pole power factor corrector is electrically connected to the AC power source and a DC-to-DC converter, and is further electrically connected to the load through the DC-to-DC converter. The totem-pole power factor corrector includes a power factor correction inductor, a first bridge arm, a second bridge arm, a positive output end, a grounding end, and a capacitor. The first bridge arm includes a first switch unit and a second switch unit. The second switch unit is connected to the first switch unit at a first node. The second bridge arm includes a third switch unit, a fourth switch unit, and two current-sampling units. The two current-sampling units include a first current-sampling unit and a second current-sampling unit. The first current-sampling unit detects a current flowing through the third switch unit, and the second current-sampling unit detects a current flowing through the fourth switch unit. The fourth switch unit is connected to the third switch unit through the second current-sampling unit, and the third switch unit is connected to the second current-sampling unit at a second node. The AC power source and the power factor correction inductor connected in series to the AC power source are connected between the first node of the first bridge arm and the second node of the second bridge arm.

The positive output end and the grounding end are electrically connected to the DC-to-DC converter. The first bridge arm, the second bridge arm, and the capacitor are connected in parallel between the positive output end and the grounding end. The first switch unit of the first bridge arm is electrically connected to the positive output end, the third switch unit of the second bridge arm is electrically connected to the positive output end through the first current-sampling unit, and the second switch unit of the first bridge arm and the fourth switch unit of the second bridge arm are electrically connected to the grounding end.

When the AC power source is in the positive half cycle, a first sampling switch on the first current sampling path of the full-bridge rectifying unit is turned on, and a current is sampled by the sampling resistor to acquire the current flowing through the switch unit. Simultaneously, a second sampling switch on the second current sampling path of the full-bridge rectifying unit is turned off so that the demagnetizing component is demagnetized to make no current flow through the sampling resistor, thereby increasing the demagnetization efficiency.

When the AC power source is in the negative half cycle, the second sampling switch on the second current sampling path of the full-bridge rectifying unit is turned on, and a current is sampled by the sampling resistor to acquire the current flowing through the switch unit. Simultaneously, the first sampling switch on the first current sampling path of the full-bridge rectifying unit is turned off so that the demagnetizing component is demagnetized to make no current flow through the sampling resistor, thereby increasing the demagnetization efficiency.

Accordingly, the increased demagnetization efficiency overcomes superimposed operations to improve current detection and effectively provide the function of power factor correction to increase conversion efficiency.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
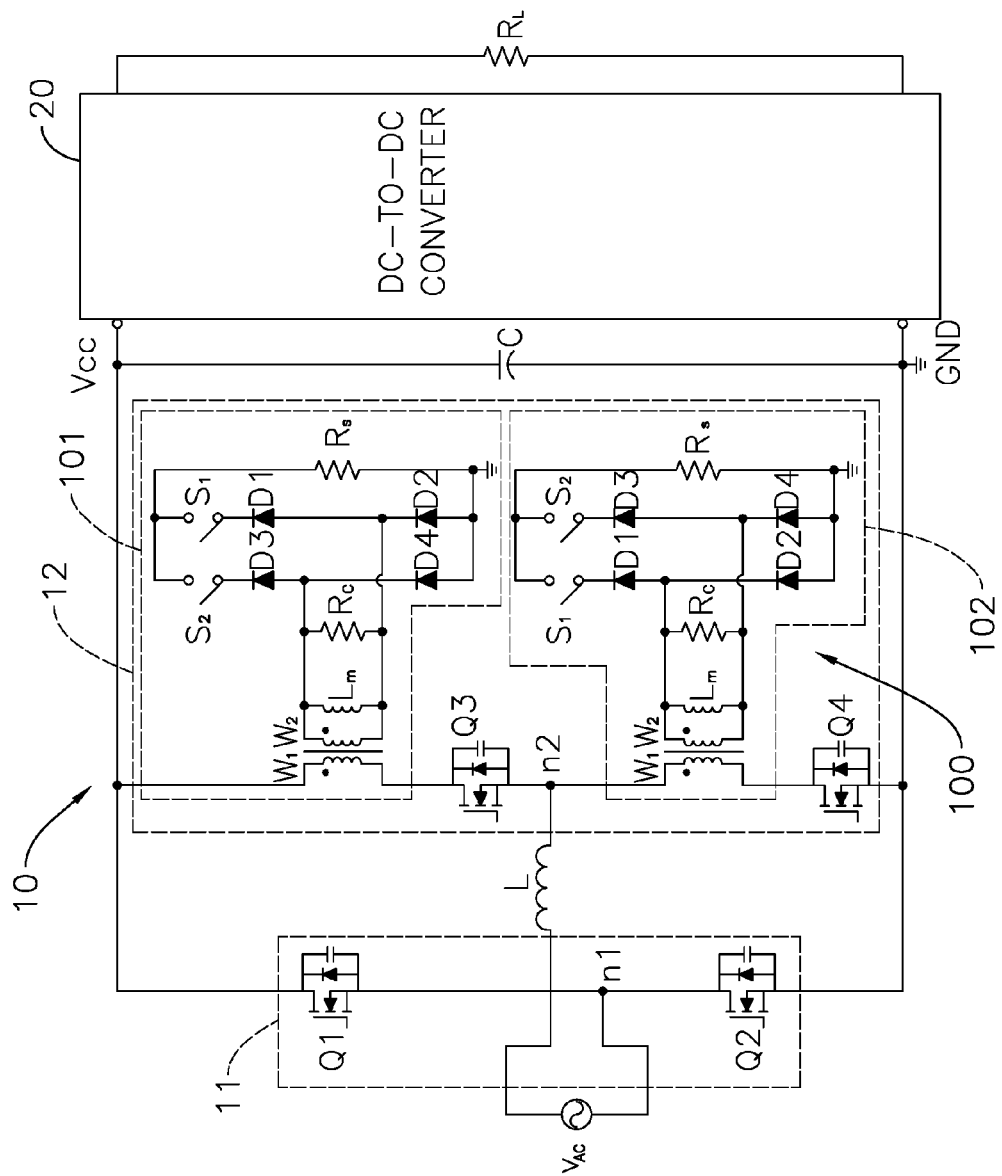
FIG. 1 is a schematic circuit diagram of a totem-pole power factor corrector (PFC) according to a first preferred embodiment of the present disclosure.

Reference will now be made to the drawing figures to describe the present disclosure in detail.

Referring to FIGS. 1 to 7, a first preferred embodiment of a current-sampling unit 100 of a totem-pole power factor corrector (PFC) 10 is disclosed in the present disclosure. With reference to FIG. 1, the totem-pole PFC 10 is electrically connected between an alternating-current (AC) power source $V_{AC}$ and a DC-to-DC converter 20, and the totem-pole PFC 10 is further electrically connected to a load $R_L$ through the DC-to-DC converter 20. The current-sampling unit 100 is provided to detect a current flowing through a switch unit Q of the totem-pole PFC 10.

In one embodiment, the totem-pole PFC 10 includes a power factor correction (PFC) inductor L, a first bridge arm 11, a second bridge arm 12, a capacitor C, a positive output end $V_{CC}$, and a grounding end GND.

The first bridge arm 11 has a first switch unit Q1 and a second switch unit Q2. The second switch unit Q2 is connected to the first switch unit Q1 at a first node n1.

The second bridge arm 12 has a third switch unit Q3, a fourth switch unit Q4, and two current-sampling units 100 including a first current-sampling unit 101 and a second current-sampling unit 102. The first current-sampling unit 101 is provided to detect a current flowing through the third switch unit Q3. The second current-sampling unit 102 is provided to detect a current flowing through the fourth switch unit Q4.

The fourth switch unit Q4 is connected to the third switch unit Q3 through the second current-sampling unit 102. The third switch unit Q3 is connected to the second current-sampling unit 102 at a second node n2.

The AC power source $V_{AC}$ and the PFC inductor L connected in series to the AC power source $V_{AC}$ are connected between the first node n1 of the first bridge arm 11 and the second node n2 of the second bridge arm 12. The positive output end $V_{CC}$ and the grounding end GND are electrically connected to the DC-to-DC converter 20.

The first bridge arm 11, the second bridge arm 12, and the capacitor C are connected in parallel between the positive output end $V_{CC}$ and the grounding end GND. The first switch unit Q1 of the first bridge arm 11 is electrically connected to the positive output end $V_{CC}$. The third switch unit Q3 of the second bridge arm 12 is electrically connected to the positive output end $V_{CC}$ through the first current-sampling unit 101. The second switch unit Q2 of the first bridge arm 11 and the fourth switch unit Q4 of the second bridge arm 12 are electrically connected to the grounding end GND.

Since the circuit structure and operations of the totem-pole PFC 10 are disclosed in the prior art, the detail description of the totem-pole PFC 10 is omitted here for conciseness.

Figure 2:
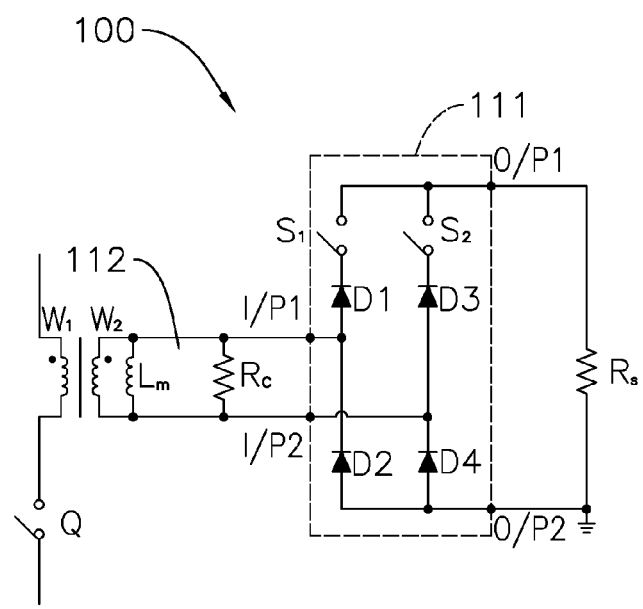
FIG. 2 is a schematic circuit diagram of a current-sampling unit according to the first preferred embodiment of the present disclosure.

Referring to FIG. 2, the current-sampling unit 100 of the totem-pole PFC 10 includes a primary-side winding $W_1$, a full-bridge rectifying unit 111, a secondary-side winding $W_2$, a magnetizing inductor $L_m$, a demagnetizing component 112, and a sampling resistor $R_S$.

The primary-side winding $W_1$ is connected in series to the switch unit Q. The full-bridge rectifying unit 111 has a first input end I/P1, a second input end I/P2, a first output end O/P1, a second output end O/P2, a first sampling switch $S_1$, and a second sampling switch $S_2$. The full-bridge rectifying unit 111 further has a first current sampling path and a second current sampling path, wherein the first sampling switch $S_1$ is on the first current sampling path and the second sampling switch $S_2$ is on the second current sampling path. The secondary-side winding $W_2$ is coupled to the primary-side winding $W_1$.

The demagnetizing component 112, the secondary-side winding $W_2$, and the magnetizing inductor $L_m$ are connected in parallel between the first input end I/P1 and the second input end I/P2 of the full-bridge rectifying unit 111. In this embodiment, the demagnetizing component 112 may be a demagnetizing resistor $R_C$.

The sampling resistor $R_S$ is electrically connected between the first output end O/P1 and the second output end O/P2 of the full-bridge rectifying unit 111.

When the AC power source $V_{AC}$ is in a positive half cycle, the first sampling switch $S_1$ is turned on, the second sampling switch $S_2$ is turned off, the magnetizing inductor $L_m$ is magnetized, and through the first current sampling path of the full-bridge rectifying unit 111, the secondary-side winding $W_2$ and the sampling resistor $R_S$ form a first loop. When the AC power source $V_{AC}$ is in the positive half cycle, the first sampling switch $S_1$ is turned on, the second sampling switch $S_2$ is turned off, the magnetizing inductor $L_m$ is demagnetized, and the magnetizing inductor $L_m$ and the sampling resistor $R_S$ are disconnected from each other When the AC power source $V_{AC}$ is in a negative half cycle, the second sampling switch $S_2$ is turned on, the first sampling switch $S_1$ is turned off, the magnetizing inductor $L_m$ is magnetized, and through the second current sampling path of the full-bridge rectifying unit 111, the secondary-side winding $W_2$ and the sampling resistor $R_S$ form a second loop. When the AC power source $V_{AC}$ is in the negative half cycle, the second sampling switch $S_2$ is turned on, the first sampling switch $S_1$ is turned off, the magnetizing inductor $L_m$ is demagnetized, and the magnetizing inductor $L_m$ and the sampling resistor $R_S$ are disconnected from each other.

The first sampling switch $S_1$ located on the first current sampling path of the full-bridge rectifying unit 111 is turned on by the current-sampling unit 100 when the AC power source $V_{AC}$ is in the positive half cycle so that an induction current generated at the secondary-side winding $W_2$ flows through the sampling resistor $R_S$ through the first current sampling path and the current, i.e., a current flowing through the switch unit Q is sampled by the sampling resistor $R_S$. Simultaneously, the second sampling switch $S_2$ located on the second current sampling path of the full-bridge rectifying unit 111 is turned off by the current-sampling unit 100 so that the demagnetizing component 112 is demagnetized and the magnetizing inductor $L_m$ and the sampling resistor $R_S$ are disconnected from each other, thereby increasing the demagnetization efficiency.

The second sampling switch $S_2$ located on the second current sampling path of the full-bridge rectifying unit 111 is turned on by the current-sampling unit 100 when the AC power source $V_{AC}$ is in the negative half cycle so that the induction current generated at the secondary-side winding $W_2$ flows through the sampling resistor $R_S$ through the second current sampling path and the current, i.e., a current flowing through the switch unit Q is sampled by the sampling resistor $R_S$. Simultaneously, the first sampling switch $S_1$ located on the first current sampling path of the full-bridge rectifying unit 111 is turned off by the current-sampling unit 100 so that the demagnetizing component 112 is demagnetized, and the magnetizing inductor $L_m$ and the sampling resistor $R_S$ are disconnected from each other, thereby increasing the demagnetization efficiency.

Accordingly, the current-sampling unit 100 is provided to increase the demagnetization efficiency and overcome superimposed operations to improve current detection and effectively provide the function of power factor correction to the totem-pole PFC 10.

In one embodiment, the full-bridge rectifying unit 111 further has a first diode D1, a second diode D2, a third diode D3, and a fourth diode D4. A cathode of the second diode D2 is electrically connected to an anode of the first diode D1. A cathode of the fourth diode D4 is electrically connected to an anode of the third diode D3. A connection node at which the first diode D1 and the second diode D2 are connected is electrically connected to the first input end I/P1 of the full-bridge rectifying unit 111, and a connection node at which the third diode D3 and the fourth diode D4 are connected is electrically connected to the second input end I/P2 of the full-bridge rectifying unit 111. A connection node at which a cathode of the first diode D1 and a cathode of the third diode D3 are connected is electrically connected to the first output end O/P1 of the full-bridge rectifying unit 111, and a connection node at which an anode of the second diode D2 and an anode of the fourth diode D4 are connected is electrically connected to the second output end O/P2 of the full-bridge rectifying unit 111.

In this preferred embodiment, the first current sampling path is formed by the first input end I/P1 of the full-bridge rectifying unit 111, the first diode D1, the first output end O/P1, the second output end O/P2, the fourth diode D4, and the second input end I/P2 of the full-bridge rectifying unit 111. The second current sampling path is formed by the second input end I/P2 of the full-bridge rectifying unit 111, the third diode D3, the first output end O/P1, the second output end O/P2, the second diode D2, and the first input end I/P1 of the full-bridge rectifying unit 111.

In one embodiment, the first sampling switch $S_1$ is located between the cathode of the first diode D1 and the first output end I/O1 of the full-bridge rectifying unit 111, and the second sampling switch $S_2$ is located between the cathode of the third diode D3 and the first output end I/O1 of the full-bridge rectifying unit 111.

Referring to FIG. 3 to FIG. 6, the detailed operations of the current-sampling unit 100 are disclosed, and the second current-sampling unit 102 is exemplified for demonstration as follows. As mentioned above, the switches of the totem-pole PFC are controlled to magnetize and demagnetize the PFC inductor L so as to implement the function of power factor correction.

Figure 15:
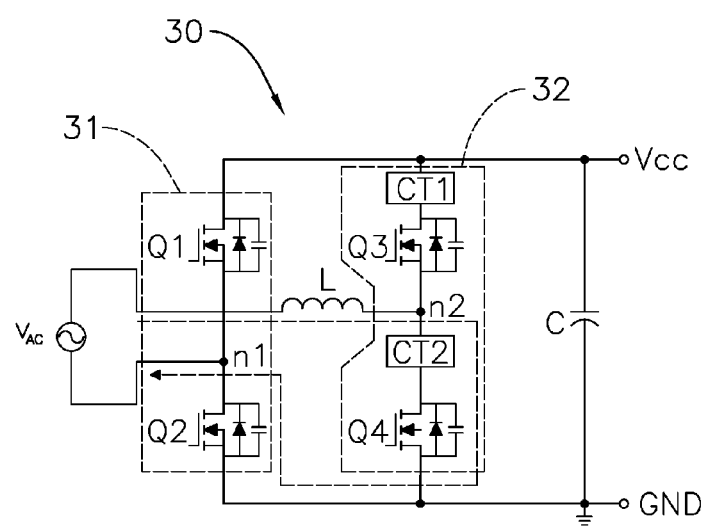
FIG. 15 to FIG. 18 are schematic circuit diagrams of operations of the conventional totem-pole PFC.

As mentioned in FIG. 15, when the AC power source $V_{AC}$ is in the positive half cycle, the first sampling switch $S_1$ is turned on, the second sampling switch $S_2$ is turned off, the PFC inductor L is magnetized, the fourth switch Q4 is turned on, and a current flows through the PFC inductor L. Similarly shown in FIG. 3, a current flows through the primary-side winding $W_1$ of the current-sampling unit 100 since the fourth switch Q4 connected in series to the primary-side winding $W_1$ is turned on. An induction current generated from the secondary-side winding $W_2$ flows through the magnetizing inductor $L_m$ and the sampling resistor $R_S$ via the first current sampling path of the full-bridge rectifying unit 111 for sampling current.

Figure 16:
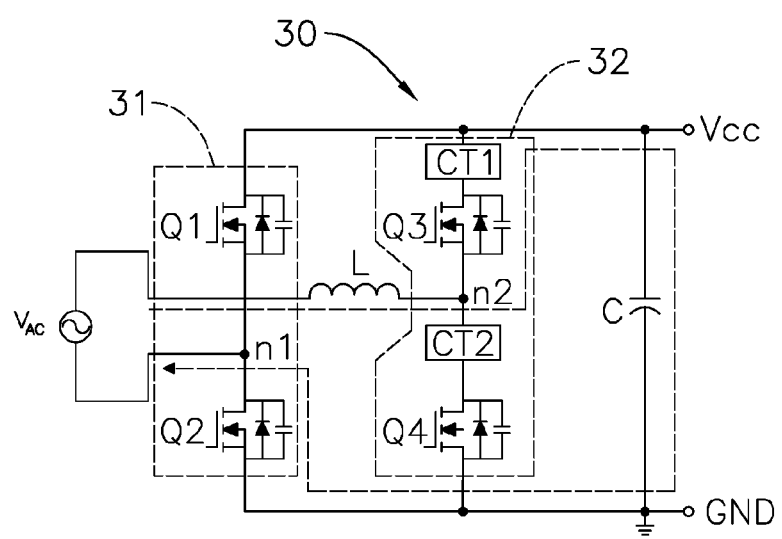

As mentioned in FIG. 16, when the AC power source $V_{AC}$ is in the positive half cycle, the first sampling switch $S_1$ is turned on, the second sampling switch $S_2$ is turned off, the PFC inductor L is demagnetized, the fourth switch Q4 is turned off, and no current flows through the PFC inductor L. Similarly shown in FIG. 4, no current flows through the primary-side winding $W_1$ of the current-sampling unit 100 since the fourth switch Q4 connected in series to the primary-side winding $W_1$ is turned off so that no current is induced from the secondary-side winding $W_2$. At this time, the magnetizing inductor $L_m$ is demagnetized. The demagnetizing current of the magnetizing inductor $L_m$ flows through the demagnetizing component 112, i.e., the demagnetizing resistor $R_C$ since there the magnetizing inductor $L_m$ and the sampling resistor $R_S$ are disconnected from each other, thereby increasing the demagnetization efficiency of the magnetizing inductor $L_m$ by the demagnetizing resistor $R_C$.

Figure 17:
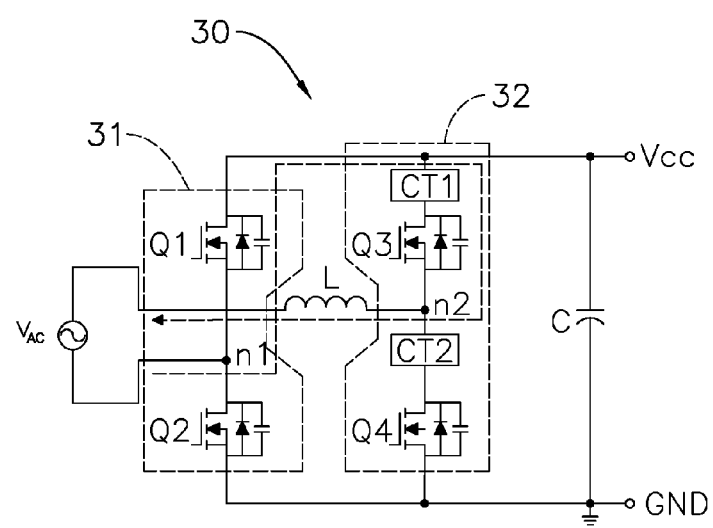

As mentioned in FIG. 17, when the AC power source $V_{AC}$ is in the negative half cycle, the second sampling switch $S_2$ is turned on, the first sampling switch $S_1$ is turned off, the PFC inductor L is magnetized, the fourth switch Q4 is turned off, and no current flows through the PFC inductor L. Similarly shown in FIG. 6, no current flows through the primary-side winding $W_1$ of the current-sampling unit 100 since the fourth switch Q4 connected in series to the primary-side winding $W_1$ is turned off so that no current is induced from the secondary-side winding $W_2$. At this time, the magnetizing inductor $L_m$ is demagnetized. The demagnetizing current of the magnetizing inductor $L_m$ flows through the demagnetizing component 112, i.e., the demagnetizing resistor $R_C$, since the magnetizing inductor $L_m$ and the sampling resistor $R_S$ are disconnected from each other, thereby increasing the demagnetization efficiency of the magnetizing inductor $L_m$ by the demagnetizing resistor $R_C$.

Figure 3:
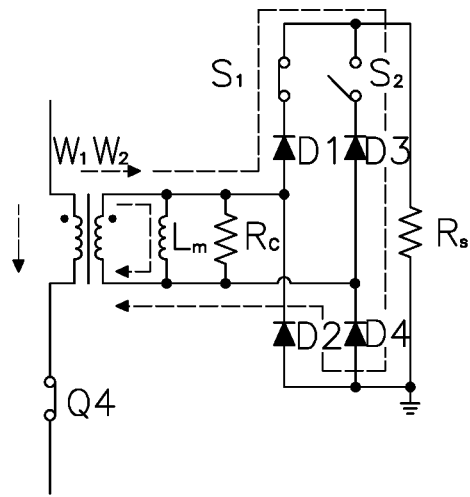
FIG. 3 to FIG. 6 are schematic circuit diagrams of operations of the current-sampling unit according to the present disclosure.
Figure 4:
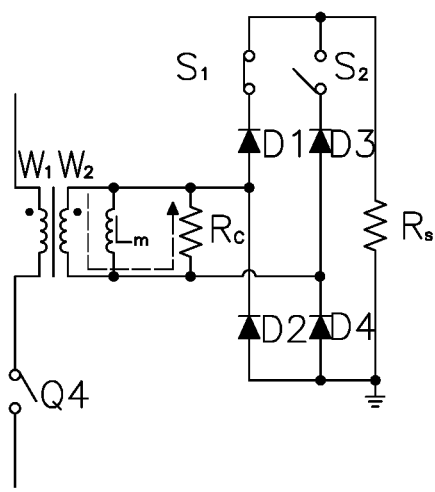
Figure 5:
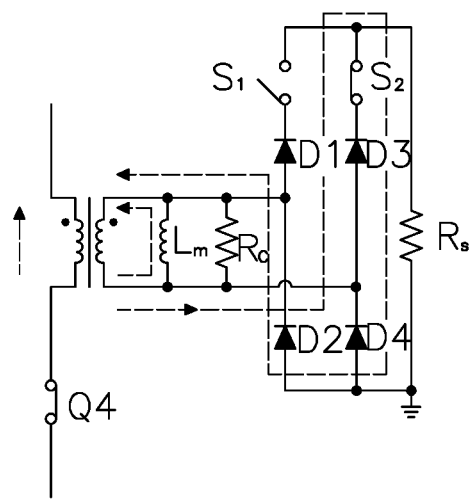
Figure 6:
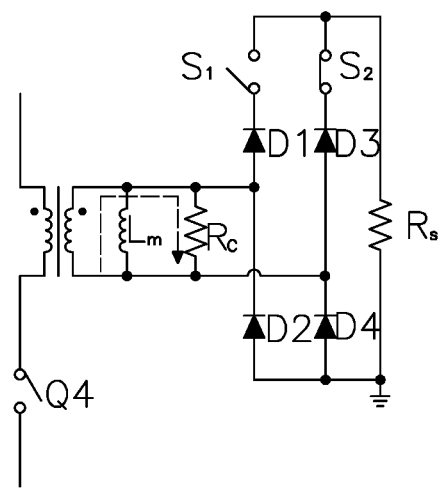
Figure 18:
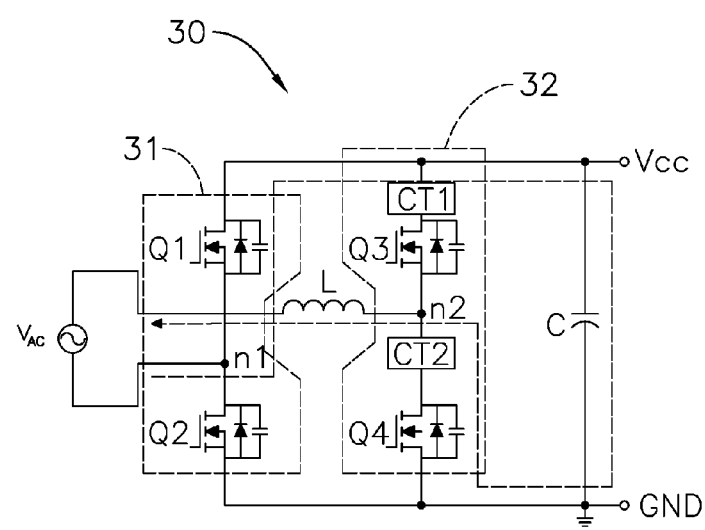
Figure 19:
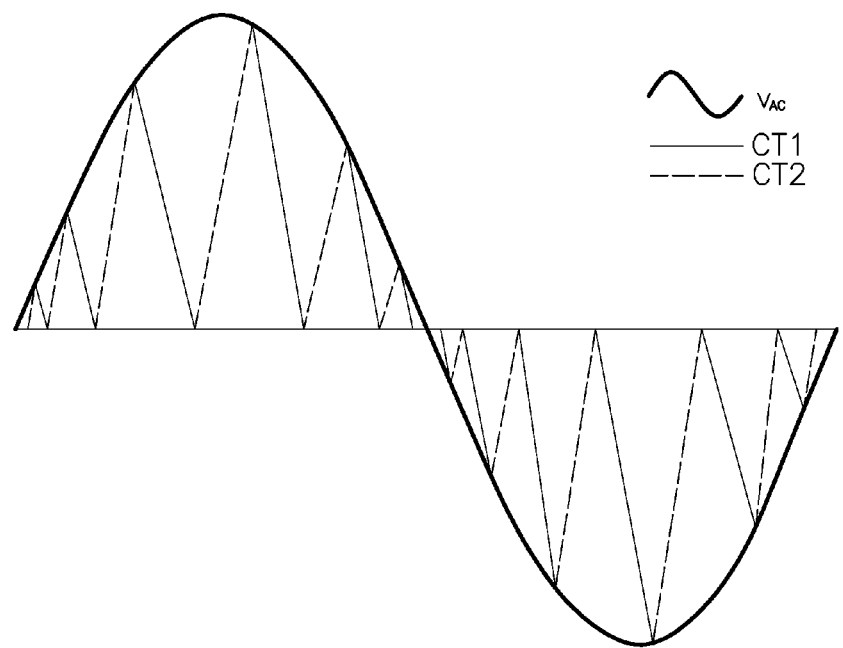
FIG. 19 is a schematic curve diagram of a current provided by an AC power source, a current detected by a first current-sampling unit, and a current detected by a second current-sampling unit.
Figure 20:
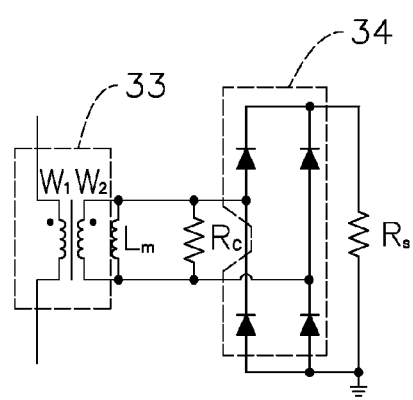
FIG. 20 is a schematic circuit diagram of a conventional current-sampling unit.
Figure 21:
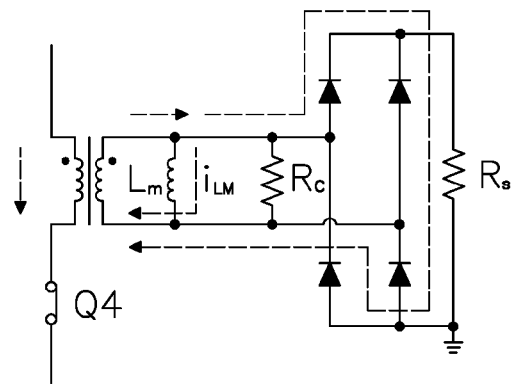
FIG. 21 to FIG. 24 are schematic circuit diagrams of operations of the conventional current-sampling unit.
Figure 22:
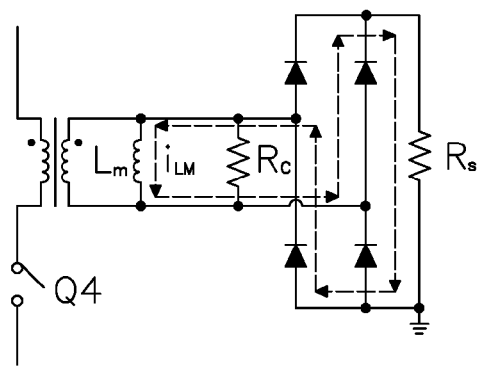
Figure 23:
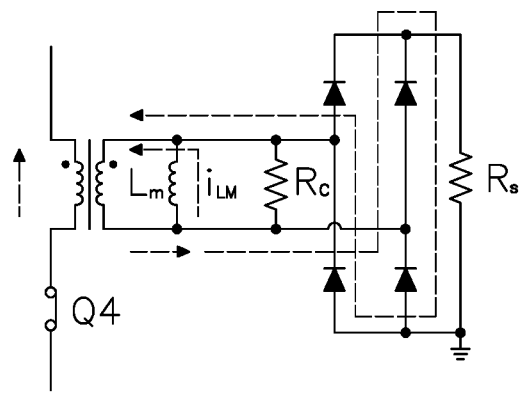
Figure 24:
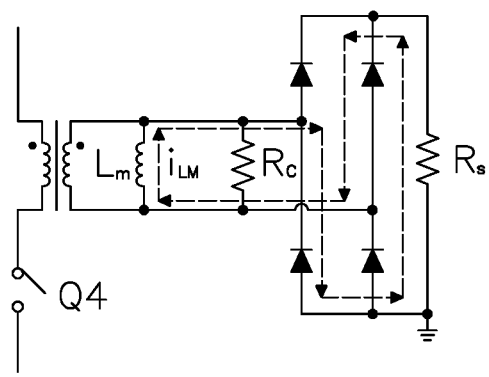

As mentioned in FIG. 18, when the AC power source $V_{AC}$ is in the negative half cycle, the second sampling switch $S_2$ is turned on, the first sampling switch $S_1$ is turned off, the PFC inductor L is demagnetized, the fourth switch Q4 is turned on, and a current flows through the primary-side winding $W_1$ of the current-sampling unit 100 in an opposite direction to the current shown in FIG. 3. Similarly shown in FIG. 5, a current flows through the primary-side winding $W_1$ of the current-sampling unit 100 since the fourth switch Q4 connected in series to the primary-side winding $W_1$ is turned on. An induction current generated from the secondary-side winding $W_2$ flows through the magnetizing inductor $L_m$ and the sampling resistor $R_S$ via the second current sampling path of the full-bridge rectifying unit 111 for sampling current.

Similar to the first current-sampling unit 101, when the AC power source $V_{AC}$ is in the positive half cycle, the second sampling switch $S_2$ is turned on, the first sampling switch $S_1$ is turned off, the PFC inductor L is magnetized, the third switch Q3 is turned off, and no current flows through the PFC inductor L so that the magnetizing inductor $L_m$ is demagnetized. The demagnetizing current of the magnetizing inductor $L_m$ flows through the demagnetizing component 112, i.e., the demagnetizing resistor $R_C$, since the magnetizing inductor $L_m$ and the sampling resistor $R_S$ are disconnected from each other, thereby increasing the demagnetization efficiency of the magnetizing inductor $L_m$ by the demagnetizing resistor $R_C$.

Similar to the first current-sampling unit 101, when the AC power source $V_{AC}$ is in the positive half cycle, the second sampling switch $S_2$ is turned on, the first sampling switch $S_1$ is turned off, the PFC inductor L is demagnetized, the third switch Q3 is turned on, and a current flows through the PFC inductor L. An induction current generated from the secondary-side winding $W_2$ flows through the magnetizing inductor $L_m$ and the sampling resistor $R_S$ via the second current sampling path of the full-bridge rectifying unit 111 for sampling current.

Similar to the first current-sampling unit 101, when the AC power source $V_{AC}$ is in the negative half cycle, the first sampling switch $S_1$ is turned on, the second sampling switch $S_2$ is turned off, the PFC inductor L is magnetized, the third switch Q3 is turned on, and a current flows through the PFC inductor L. An induction current generated from the secondary-side winding $W_2$ flows through the magnetizing inductor $L_m$ and the sampling resistor $R_S$ via the first current sampling path of the full-bridge rectifying unit 111 for sampling current.

Similar to the first current-sampling unit 101, when the AC power source $V_{AC}$ is in the negative half cycle, the first sampling switch $S_1$ is turned on, the second sampling switch $S_2$ is turned off, the PFC inductor L is demagnetized, the third switch Q3 is turned off, and no current flows through the PFC inductor L so that the magnetizing inductor $L_m$ is demagnetized. The demagnetizing current of the magnetizing inductor $L_m$ flows through the demagnetizing component 112, i.e., the demagnetizing resistor $R_C$, since the magnetizing inductor $L_m$ and the sampling resistor $R_S$ are disconnected from each other, thereby increasing the demagnetization efficiency of the magnetizing inductor $L_m$ by the demagnetizing resistor $R_C$.

Figure 7:
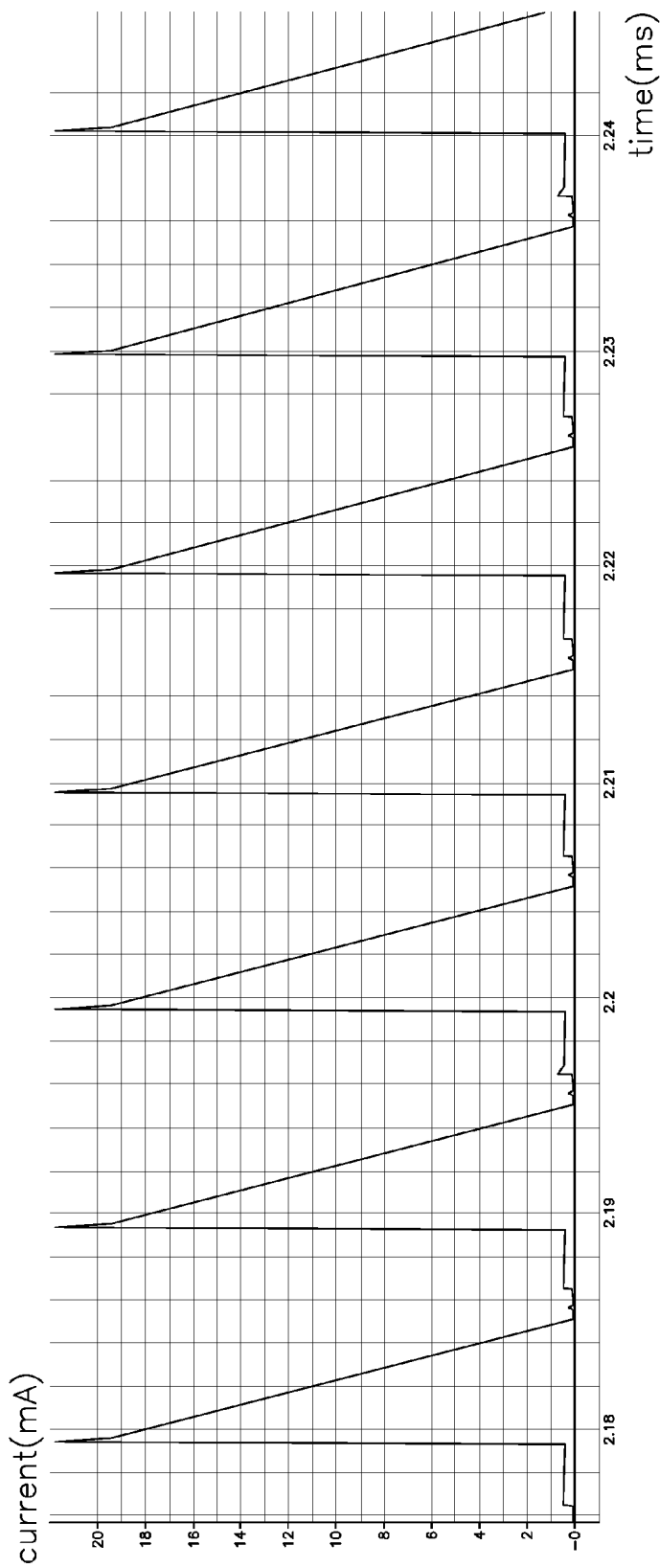
FIG. 7 is a schematic curve diagram of a sampling current according to the first preferred embodiment of the present disclosure.

FIG. 7 shows a curve of the sampling current of the sampling resistor $R_S$. Since the sampling resistor $R_S$ can sample a current flowing through the sampling resistor $R_S$ only when the fourth switch Q4 is turned on, a curve of a sampling current of the sampling resistor $R_S$ is shown in FIG. 7 when the AC power source $V_{AC}$ is in the positive half cycle. Since the sampled current is zero when the magnetizing inductor $L_m$ is fully demagnetized, no superimposed operation exists.

The first sampling switch $S_1$ and the second sampling switch $S_2$ are switched according to different half cycles of the AC power source $V_{AC}$. In other words, a switching frequency of the first sampling switch $S_1$ and the second sampling switch $S_2$ is identical to a line frequency of the AC power source $V_{AC}$. When the AC power source $V_{AC}$ is changed from the positive half cycle to the negative half cycle, the on/off conditions of the first sampling switch $S_1$ and the second sampling switch $S_2$ are changed, thereby reducing switching losses of the first sampling switch $S_1$ and the second sampling switch $S_2$ by reducing switching times of the first sampling switch $S_1$ and the second sampling switch $S_2$.

Since a direction of the current flowing through the fourth switch Q4 when the AC power source $V_{AC}$ is in the positive half cycle is just opposite a direction of the current flowing through the fourth switch Q4 when the AC power source $V_{AC}$ is in the negative half cycle, the current-sampling unit 100 may be used for sampling current in a bidirectional manner, thereby increasing the applicability of the present disclosure.

Figure 8:
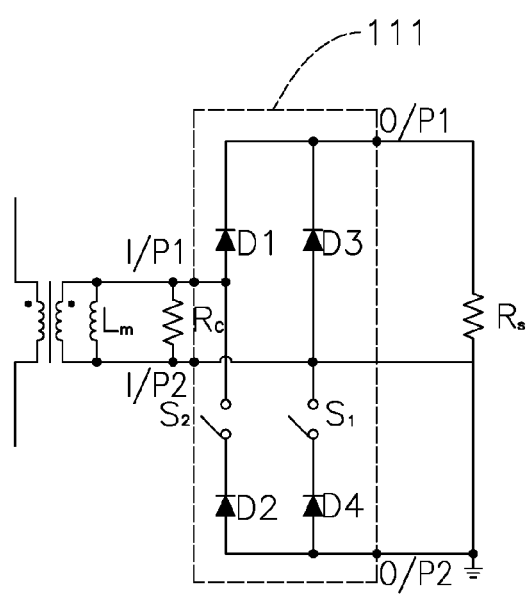
FIG. 8 is a schematic circuit diagram of the current-sampling unit according to a second preferred embodiment of the present disclosure.

In a second preferred embodiment shown in FIG. 8, since the first sampling switch $S_1$ of the full-bridge rectifying unit 111 is located on the first current sampling path and the second sampling switch $S_2$ of the full-bridge rectifying unit 111 is located on the second current sampling path, the first sampling switch $S_1$ may be located between the cathode of the fourth diode D4 and the second input end I/P2, and the second sampling switch $S_2$ may be located between the cathode of the second diode D2 and the first input end I/P1 of the full-bridge rectifying unit 111.

Figure 9:
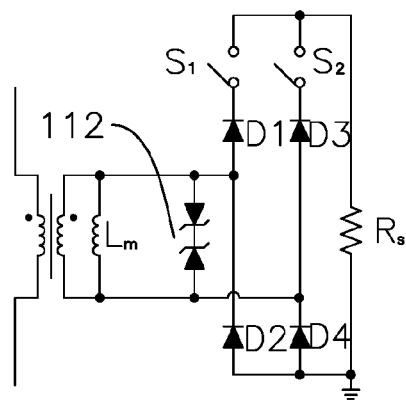
FIG. 9 is a schematic circuit diagram of the current-sampling unit according to a third preferred embodiment of the present disclosure.

In a third embodiment shown in FIG. 9, the demagnetizing component 112 is composed of two Zener diodes connected in back-to-back series.

Figure 10:
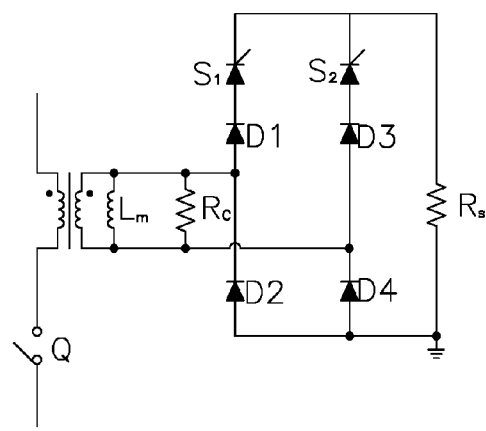
FIG. 10 is a schematic circuit diagram of the current-sampling unit according to a fourth preferred embodiment of the present disclosure.

In a fourth embodiment shown in FIG. 10, the first sampling switch S₁ and the second sampling switch S₂ are a silicon controlled rectifier (SCR), respectively.

Figure 11:
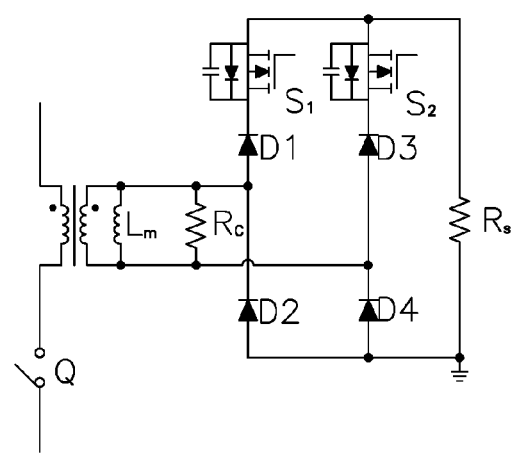
FIG. 11 is a schematic circuit diagram of the current-sampling unit according to a fifth preferred embodiment of the present disclosure.

In a fifth embodiment shown in FIG. 11, the first sampling switch S₁ and the second sampling switch S₂ are each respectively a metal-oxide-semiconductor field-effect transistor (MOSFET).

Figure 12:
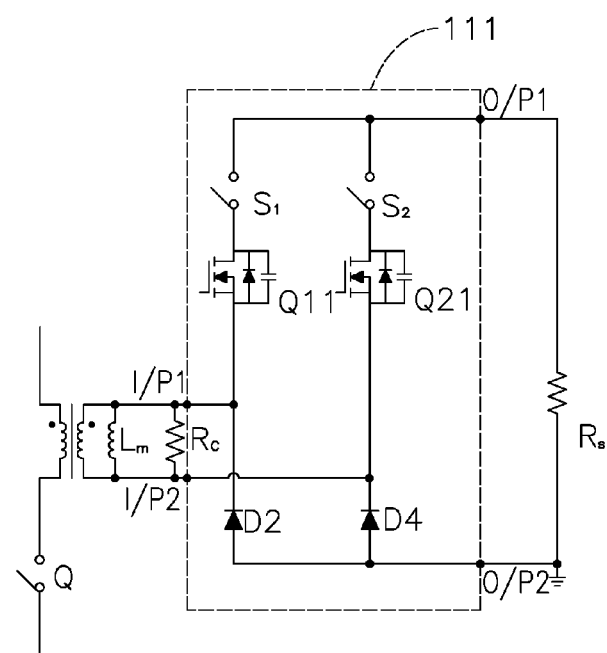
FIG. 12 is a schematic circuit diagram of the current-sampling unit according to a sixth preferred embodiment of the present disclosure.

In a sixth embodiment shown in FIG. 12, the full-bridge rectifying unit 111 has a first rectifying switch Q11, a second rectifying switch Q21, a second diode D2, and a fourth diode D4.

The cathode of the second diode D2 is electrically connected to the first output end O/P1 sequentially through the first rectifying switch Q11 and the first sampling switch S₁. The cathode of the fourth diode D4 is electrically connected to the first output end O/P1 sequentially through the second rectifying switch Q21 and the first sampling switch S₂. A connection node at which the first rectifying switch Q11 and the cathode of the second diode D2 are connected is electrically connected to the first input end I/P1 of the full-bridge rectifying unit 111. A connection node at which the second rectifying switch Q21 and the cathode of the fourth diode D4 are connected is electrically connected to the second input end I/P2 of the full-bridge rectifying unit 111.

Figure 13:
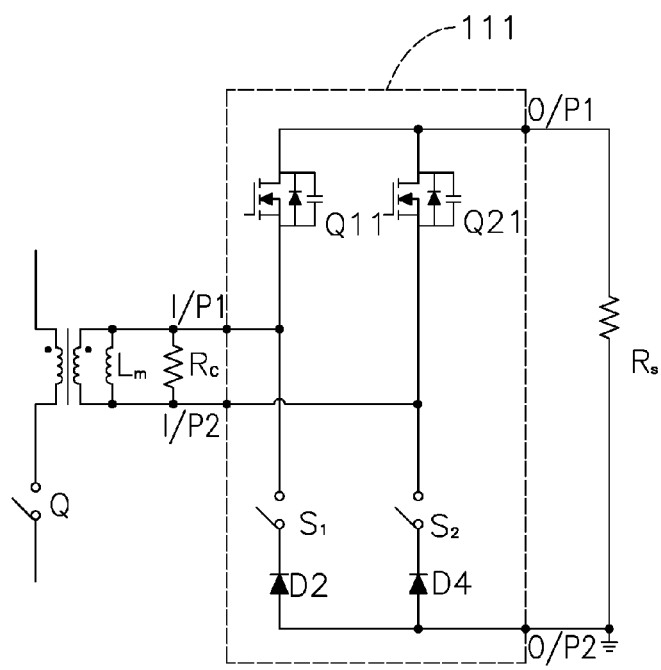
FIG. 13 is a schematic circuit diagram of the current-sampling unit according to a seventh preferred embodiment of the present disclosure.
Figure 14:
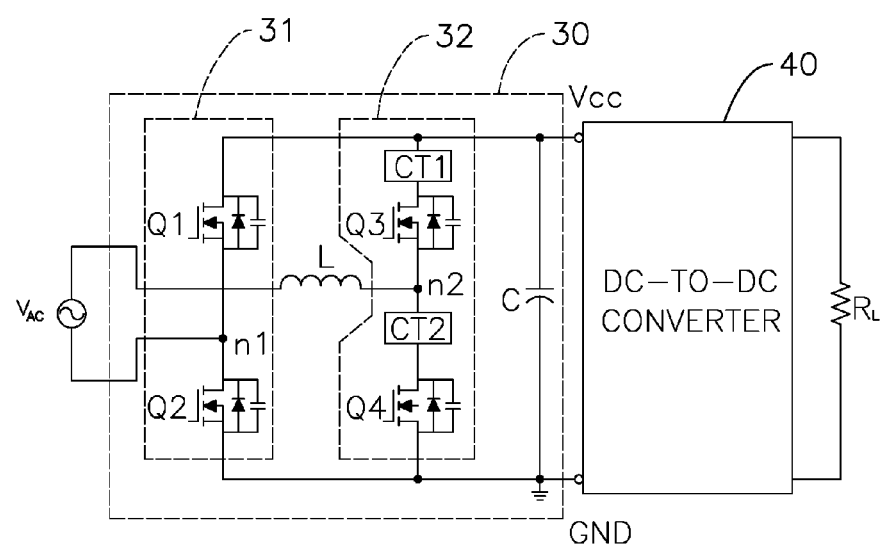
FIG. 14 is a schematic circuit diagram of a conventional totem-pole PFC.

As shown in FIG. 13, the full-bridge rectifying unit 111 includes a first rectifying switch Q11, a second rectifying switch Q21, a second diode D2, and a fourth diode D4.

The cathode of the second diode D2 is electrically connected to the first output end O/P1 sequentially through the second sampling switch S₂ and the first rectifying switch Q11. The cathode of the fourth diode D4 is electrically connected to the first output end O/P1 sequentially through the first sampling switch S₁ and the second rectifying switch Q21. A connection node at which the second sampling switch S₂ and the first rectifying switch Q11 are connected is electrically connected to the first input end I/P1 of the full-bridge rectifying unit 111. A connection node at which the first sampling switch S₁ and the second rectifying switch Q21 are connected is electrically connected to the second input end I/P2 of the full-bridge rectifying unit 111.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A current-sampling unit of a totem-pole power factor corrector that is electrically connected to an alternating-current (AC) power source and a load through a DC-to-DC converter, the current-sampling unit configured to detect a current flowing through a switch unit of the totem-pole power factor corrector, and comprising:
   a primary-side winding connected in series to the switch unit;
   a full-bridge rectifying unit having a first input end, a second input end, a first output end, a second output end, a first sampling switch, and a second sampling switch, and further having a first current sampling path and a second current sampling path, wherein the first sampling switch is on the first current sampling path and the second sampling switch is on the second current sampling path;
   a secondary-side winding coupled to the primary-side winding;
   a magnetizing inductor;
   a demagnetizing component connected in parallel to the secondary-side winding and the magnetizing inductor between the first input end and the second input end of the full-bridge rectifying unit;
   a sampling resistor electrically connected between the first output end and the second output end of the full-bridge rectifying unit;
   wherein when the AC power source is in a positive half cycle, the first sampling switch is turned on, the second sampling switch is turned off, the magnetizing inductor is magnetized, and through the first current sampling path of the full-bridge rectifying unit, the secondary-side winding and the sampling resistor form a first loop, and when the AC power source is in the positive half cycle, the first sampling switch is turned on, the second sampling switch is turned off, the magnetizing inductor is demagnetized, and the magnetizing inductor and the sampling resistor are disconnected from each other;
   wherein when the AC power source is in a negative half cycle, the second sampling switch is turned on, the first sampling switch is turned off, the magnetizing inductor is magnetized, and through the second current sampling path of the full-bridge rectifying unit, the secondary-side winding and the sampling resistor form a second loop, and when the AC power source is in the negative half cycle, the second sampling switch is turned on, the first sampling switch is turned off, the magnetizing inductor is demagnetized, and the magnetizing inductor and the sampling resistor are disconnected from each other.

2. The current-sampling unit of the totem-pole power factor corrector as claimed in claim 1, wherein the full-bridge rectifying unit further comprises:
   a first diode;
   a second diode, a cathode of the second diode electrically connected to an anode of the first diode;
   a third diode;
   a fourth diode, a cathode of the fourth diode electrically connected to an anode of the third diode;
   wherein a connection node at which the first diode and the second diode are connected is electrically connected to the first input end of the full-bridge rectifying unit, and a connection node at which the third diode and the fourth diode are connected is electrically connected to the second input end of the full-bridge rectifying unit;
   wherein a connection node at which a cathode of the first diode and a cathode of the third diode are connected is electrically connected to the first output end of the full-bridge rectifying unit, and a connection node at which an anode of the second diode and an anode of the fourth diode are connected is electrically connected to the second output end of the full-bridge rectifying unit;
   wherein the first current sampling path is formed by the first input end of the full-bridge rectifying unit, the first diode, the first output end, the second output end, the fourth diode, and the second input end of the full-bridge rectifying unit;
   wherein the second current sampling path is formed by the second input end of the full-bridge rectifying unit, the third diode, the first output end, the second output end, the second diode, and the first input end of the full-bridge rectifying unit.

3. The current-sampling unit of the totem-pole power factor corrector as claimed in claim 2, wherein the first sampling switch of the full-bridge rectifying unit is located between the cathode of the first diode and the first output end of the full-bridge rectifying unit, and the second sampling switch is located between the cathode of the third diode and the second output end of the full-bridge rectifying unit.

4. The current-sampling unit of the totem-pole power factor corrector as claimed in claim 3, wherein the first sampling switch and the second sampling switch are each respectively a silicon controlled rectifier (SCR); or the first sampling switch and the second sampling switch are each respectively a metal-oxide-semiconductor field-effect transistor (MOSFET).

5. The current-sampling unit of the totem-pole power factor corrector as claimed in claim 3, wherein the demagnetizing component is a demagnetizing resistor or two Zener diodes connected in back-to-back series.

6. The current-sampling unit of the totem-pole power factor corrector as claimed in claim 2, wherein the first sampling switch of the full-bridge rectifying unit is located between the cathode of the fourth diode and the second input end of the full-bridge rectifying unit, and the second sampling switch of the full-bridge rectifying unit is located between the cathode of the second diode and the first input end of the full-bridge rectifying unit.

7. The current-sampling unit of the totem-pole power factor corrector as claimed in claim 6, wherein the demagnetizing component is a demagnetizing resistor or two Zener diodes connected in back-to-back series.

8. The current-sampling unit of the totem-pole power factor corrector as claimed in claim 6, wherein the first sampling switch and the second sampling switch are each respectively a silicon controlled rectifier (SCR); or the first sampling switch and the second sampling switch are each respectively a metal-oxide-semiconductor field-effect transistor (MOSFET).

9. The current-sampling unit of the totem-pole power factor corrector as claimed in claim 2, wherein the demagnetizing component is a demagnetizing resistor or two Zener diodes connected in back-to-back series.

10. The current-sampling unit of the totem-pole power factor corrector as claimed in claim 2, wherein the first sampling switch and the second sampling switch are each respectively a silicon controlled rectifier (SCR); or the first sampling switch and the second sampling switch are each respectively a metal-oxide-semiconductor field-effect transistor (MOSFET).

11. The current-sampling unit of the totem-pole power factor corrector as claimed in claim 1, wherein the full-bridge rectifying unit comprises:
   a first rectifying switch;
   a second rectifying switch;
   a second diode, a cathode of the second diode is electrically connected to the first output end sequentially through the first rectifying switch and the first sampling switch; and
   a fourth diode, a cathode of the fourth diode is electrically connected to the first output end sequentially through the second rectifying switch and the second sampling switch;
   wherein a connection node at which the first rectifying switch and the cathode of the second diode are connected is electrically connected to the first input end of the full-bridge rectifying unit, and a connection node at which the second rectifying switch and the cathode of the fourth diode are connected is electrically connected to the second input end of the full-bridge rectifying unit.

12. The current-sampling unit of the totem-pole power factor corrector as claimed in claim 11, wherein the demagnetizing component is a demagnetizing resistor or two Zener diodes connected in back-to-back series.

13. The current-sampling unit of the totem-pole power factor corrector as claimed in claim 11, wherein the first sampling switch and the second sampling switch are each respectively a silicon controlled rectifier (SCR); or the first sampling switch and the second sampling switch are each respectively a metal-oxide-semiconductor field-effect transistor (MOSFET).

14. The current-sampling unit of the totem-pole power factor corrector as claimed in claim 1, wherein the full-bridge rectifying unit comprises:
   a first rectifying switch;
   a second rectifying switch;
   a second diode, a cathode of the second diode is electrically connected to the first output end sequentially through the second sampling switch and the first rectifying switch; and
   a fourth diode, a cathode of the fourth diode is electrically connected to the first output end sequentially through the first sampling switch and the second rectifying switch;
   wherein a connection node at which the second sampling switch and the first rectifying switch are connected is electrically connected to the first input end of the full-bridge rectifying unit, and a connection node at which the first sampling switch and the second rectifying switch are connected is electrically connected to the second input end of the full-bridge rectifying unit.

15. The current-sampling unit of the totem-pole power factor corrector as claimed in claim 14, wherein the demagnetizing component is a demagnetizing resistor or two Zener diodes connected in back-to-back series.

16. The current-sampling unit of the totem-pole power factor corrector as claimed in claim 14, wherein the first sampling switch and the second sampling switch are each respectively a silicon controlled rectifier (SCR); or the first sampling switch and the second sampling switch are each respectively a metal-oxide-semiconductor field-effect transistor (MOSFET).

17. The current-sampling unit of the totem-pole power factor corrector as claimed in claim 1, wherein the demagnetizing component is a demagnetizing resistor or two Zener diodes connected in back-to-back series.

18. The current-sampling unit of the totem-pole power factor corrector as claimed in claim 1, wherein the first sampling switch and the second sampling switch are each respectively a silicon controlled rectifier (SCR); or the first sampling switch and the second sampling switch are each respectively a metal-oxide-semiconductor field-effect transistor (MOSFET).

19. A totem-pole power factor corrector electrically connected to an alternating-current (AC) power source and a DC-to-DC converter, and further electrically connected to a load through the DC-to-DC converter, the totem-pole power factor corrector comprising:
   a power factor correction inductor;
   a first bridge arm comprising:
      a first switch unit;
      a second switch unit connected to the first switch unit at a first node;
   a second bridge arm comprising:
      a third switch unit;
      a fourth switch unit;

a first current-sampling unit and a second current-sampling unit; wherein the first current-sampling unit is configured to detect a current flowing through the third switch unit, and the second current-sampling unit is configured to detect a current flowing through the fourth switch unit; wherein the fourth switch unit is connected to the third switch unit through the second current-sampling unit, and the third switch unit is connected to the second current-sampling unit at a second node; wherein the AC power source and the power factor correction inductor connected in series to the AC power source are connected between the first node of the first bridge arm and the second node of the second bridge arm;

a positive output end;

a grounding end; wherein the positive output end and the grounding end are electrically connected to the DC-to-DC converter; and a capacitor; wherein the first bridge arm, the second bridge arm, and the capacitor are connected in parallel between the positive output end and the grounding end; the first switch unit of the first bridge arm is electrically connected to the positive output end, the third switch unit of the second bridge arm is electrically connected to the positive output end through the first current-sampling unit, and the second switch unit of the first bridge arm and the fourth switch unit of the second bridge arm are electrically connected to the grounding end;

wherein each of the first current-sampling unit and the second current-sampling unit comprises:
  a primary-side winding connected in series to the third switch unit or the fourth switch unit,
  a full-bridge rectifying unit having a first input end, a second input end, a first output end, a second output end, a first sampling switch, and a second sampling switch, and further having a first current sampling path and a second current sampling path, wherein the first sampling switch is on the first current sampling path and the second sampling switch is on the second current sampling path;
  a secondary-side winding coupled to the primary-side winding;
  a magnetizing inductor;
  a demagnetizing component connected in parallel to the secondary-side winding and the magnetizing inductor between the first input end and the second input end of the full-bridge rectifying unit;
  a sampling resistor electrically connected between the first output end and the second output end of the full-bridge rectifying unit;
  wherein when the AC power source is in a positive half cycle, the first sampling switch is turned on, the second sampling switch is turned off, the magnetizing inductor is magnetized, and through the first current sampling path of the full-bridge rectifying unit, the secondary-side winding and the sampling resistor form a first loop, and when the AC power source is in the positive half cycle, the first sampling switch is turned on, the second sampling switch is turned off, the magnetizing inductor is demagnetized, and the magnetizing inductor and the sampling resistor are disconnected from each other;
  wherein when the AC power source is in a negative half cycle, the second sampling switch is turned on, the first sampling switch is turned off, the magnetizing inductor is magnetized, and through the second current sampling path of the full-bridge rectifying unit, the secondary-side winding and the sampling resistor form a second loop, and when the AC power source is in the negative half cycle, the second sampling switch is turned on, the first sampling switch is turned off, the magnetizing inductor is demagnetized, and the magnetizing inductor and the sampling resistor are disconnected from each other.

20. The totem-pole power factor corrector as claimed in claim 19, wherein
  when the AC power source is in the positive half cycle, the first sampling switch of the first current-sampling unit is turned on, the second sampling switch of the first current-sampling unit is turned off, the first sampling switch of the second current-sampling unit is turned on, and the second sampling switch of the second current-sampling unit is turned off;
  when the AC power source is in the negative half cycle, the second sampling switch of the first current-sampling unit is turned on, the first sampling switch of the first current-sampling unit is turned off, the second sampling switch of the second current-sampling unit is turned on, and the first sampling switch of the second current-sampling unit is turned off.

* * * * *